(No Model.)

J. L. SCUDDER.
HARROW.

No. 531,009. Patented Dec. 18, 1894.

Witnesses:
C. J. Williamson
C. W. Curtis

Inventor
John L. Scudder
by Franklin H. Hough
Atty.

UNITED STATES PATENT OFFICE.

JOHN L. SCUDDER, OF MIDDLE GROVE, ILLINOIS.

HARROW.

SPECIFICATION forming part of Letters Patent No. 531,009, dated December 18, 1894.

Application filed September 28, 1891. Renewed August 8, 1894. Serial No. 519,775. (No model.)

*To all whom it may concern:*

Be it known that I, JOHN L. SCUDDER, a citizen of the United States, residing at Middle Grove, in the county of Fulton and State of Illinois, have invented certain new and useful Improvements in Harrows; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in wheeled harrows, and it has for its object to provide a wheeled vehicle to which may be readily attached any of the ordinary forms or drags or harrows of a like character. The carriage or vehicle is provided with a seat for the driver, and the connections between the vehicle and the harrow are such as to permit the driver by the simple manipulation of an operating lever which is arranged within convenient distance from the seat, to raise the harrow from the ground, when it may be found desirable, as in turning at the end of the field, or in passing over ground which it is not desired to harrow.

A further object of the invention is to provide at the extreme forward end of the vehicle frame, a swiveled wheel, so arranged as to permit the driver to guide the vehicle at will, thus avoiding obstructions and permitting the harrow to pass in close proximity to stones, stumps or fences.

To these ends and to such others as the invention may pertain, the same consists in the peculiar construction, and in the novel combination, arrangement and adaptation of parts, all as more fully hereinafter described, shown in the accompanying drawings, and then specifically defined in the appended claim.

The invention is clearly illustrated in the accompanying drawings, which, with the letters of reference marked thereon, form a part of this specification, like letters of reference indicating like parts throughout both views, and in which drawings—

Figure 1:
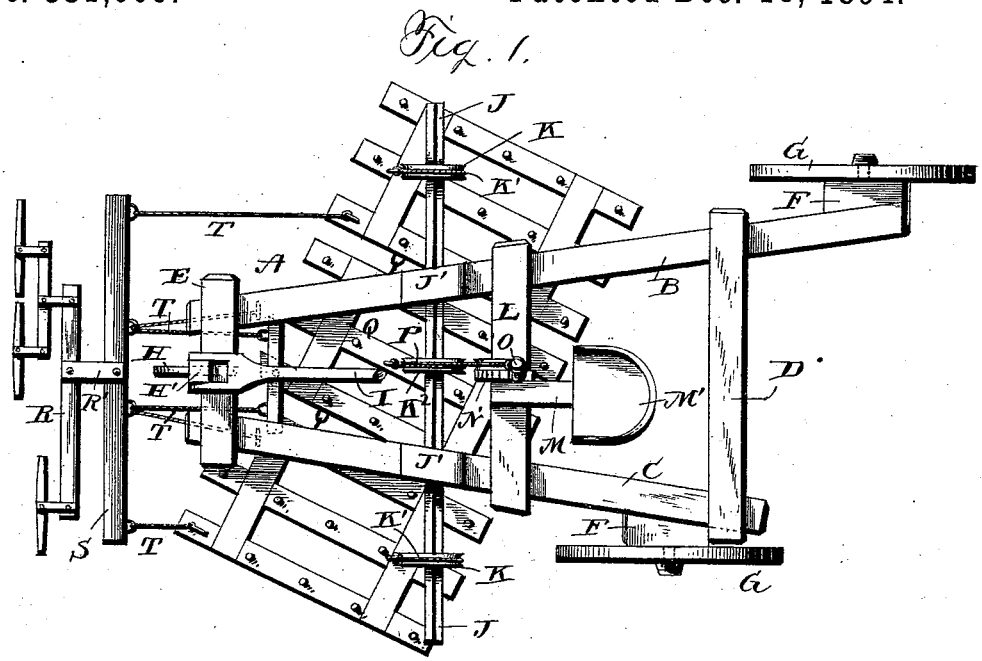
Figure 2:
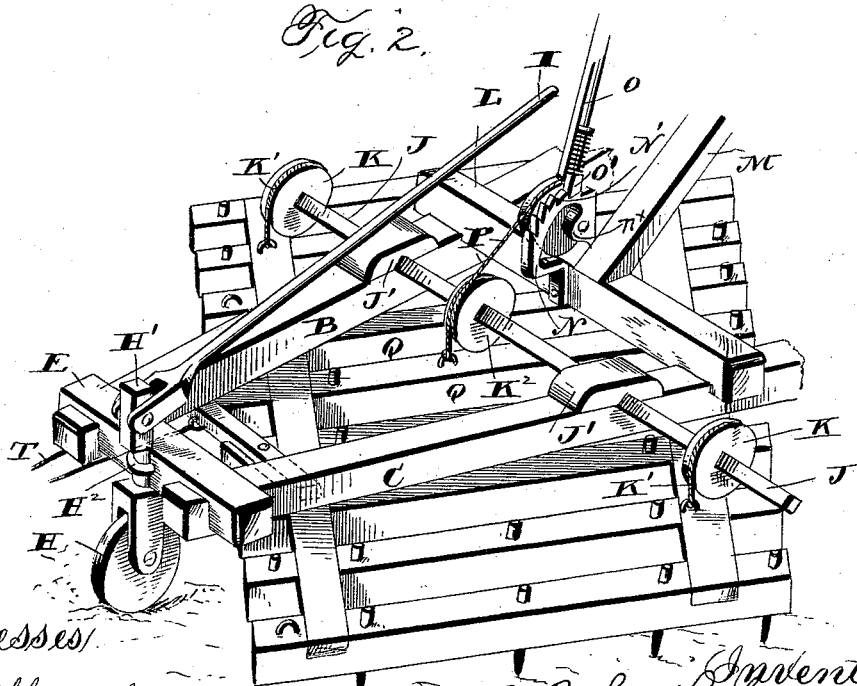

Figure 1 is a top plan view of a wheeled harrow constructed in accordance with my invention. Fig. 2 is a like view of the forward portion of the same, with the harrow shown as raised from the ground.

Reference now being had to the details of the drawings by letter, A designates the main frame of the carriage which is composed of the side timbers B and C, and the cross timbers D and E. To the outer faces of the side timbers B and C of the frame, at their rear ends, are secured the wedge shaped or beveled blocks F, F, and the wheels G, G are journaled upon stub axles extending from the outer faces of said blocks, as shown.

It will be observed that the side timber B of the frame extends for a considerable distance to the rear of the rear cross timber D, for a purpose which will be presently explained.

H is a small wheel, which is suitably journaled within the forked or bifurcated lower end of the post or standard H'; said standard being journaled at substantially its longitudinal center, in bearings $H^2$ carried by the front cross-bar E of the frame. The upper end of this standard, which extends for a short distance above the frame A, is provided with a lever I, which extends to a point within convenient reach of the driver, and by the movement of this lever the direction of movement of the machine may be controlled.

J is a transverse shaft which extends across the upper face of the frame A of the machine, a short distance in advance of the driver's seat, said shaft being provided with suitable bearings J' upon the side timbers, and it is provided with a series of pulleys or drums K, K, around which are passed the ropes or chains K'. At the longitudinal center of the shaft J, a drum or pulley $K^2$ is provided. To the central cross timber L of the frame is secured the lower end of the rearwardly inclined seat supporting timber M, upon the upper end of which is secured the seat M'. Rising from the timber L at one side of the seat, is a standard N, the upper end of which is rounded and provided with a series of notches N', and pivoted to the outer face of this standard N, is the lower end of the lever O.

The standard N which is secured to the cross-timber L consists of a skeleton casting having a rounded and notched upper face, portions to embrace the said timber, and a forwardly projecting lug n extending into the opening embraced by the casting, and the lever O is pivoted on a pivot head in the lug, as seen best in Fig. 2.

A rope or cable P has one of its ends attached to the central drag or harrow Q, and said rope after having been passed around the pulley K², is secured to the lever O. The horses are attached to the doubletree R, secured by means of the clevis R' to the bar S, which bar is attached to the drags or harrows, by the ropes or chains T, as shown.

The operation of the device is simple and readily understood. It will be seen that by having the wheel at the rear end of the machine, upon the right hand side of the frame, placed at a considerable distance to the rear of the wheel upon the opposite side of the machine, a series of two or more drags or cultivators may be used, as shown in the drawings, the same extending diagonally across beneath the frame. The said harrows are so attached to the frame of the vehicle, as to permit their free movement. Although each of the harrows is attached to the vehicle at a single point only, it may be freely and quickly raised free from the ground by a movement on the lever, and is held in its suspended position. The engagement of the pivoted dog or latch O' with the notches N' upon the standard N, serves to hold the lever in the position at which it is placed.

Having thus described my invention, what I claim to be new, and desire to secure by Letters Patent, is—

The herein shown and described harrow composed of a frame having its rear wheels set the one in advance of the other, and having the front wheel under the control of the driver, a transverse shaft having a series of pulleys K, K, K² a harrow located beneath the frame at an angle to the line of the draft, cords K' attached at their ends, respectively, to the pulleys K and the ends of the harrow, a hand operated lever, a cord P passing around the pulley K² and attached at its ends respectively, to the said lever and the harrow, whereby on operating the said lever the transverse shaft will be rotated by means of the cord P, and the said harrow will be elevated through the medium of the cords P and K', a bar S, cords connecting the ends of the bar S with the ends of the harrow, and intermediate cords having attachments midway of their ends with the middle portion of the bar S, and having their ends connected, respectively, with the harrow and the wheel supported frame, substantially as shown and described.

In testimony whereof I affix my signature in presence of two witnesses.

JOHN L. SCUDDER.

Witnesses:
I. T. SCUDDER,
A. H. WORDEN.